Patented Feb. 17, 1948

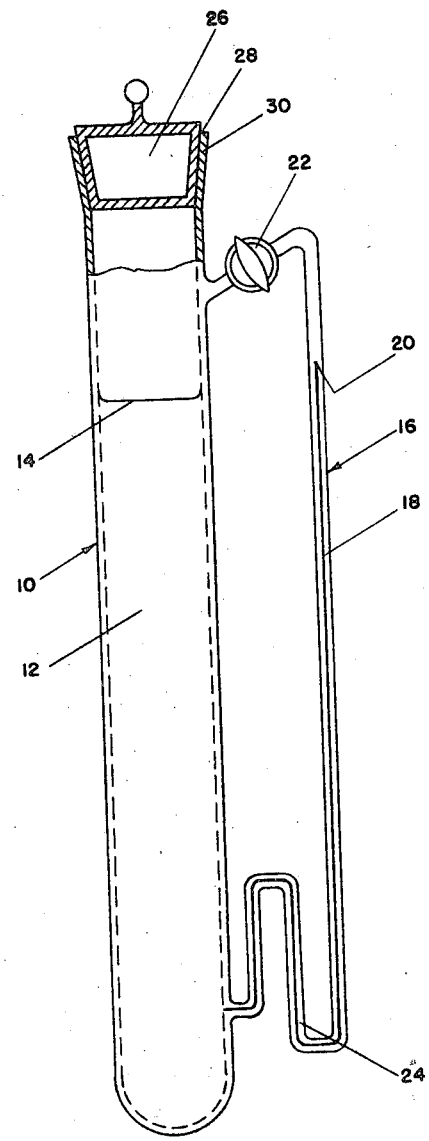

2,436,083

UNITED STATES PATENT OFFICE 2,436,083

SEDIMENTATION TUBE

John W. Williams, Madison, Wis., and Edward M. Bevilacqua, Rutherford, N. J., assignors to The United States of America, as represented by the Atomic Energy Commission Application June 12, 1945, Serial No. 599,071

5 Claims. (Cl. 73—61)

This invention relates to sedimentation and more particularly to an improved apparatus for determining the rate at which particles of a finely divided material settle when such particles are dispersed in a liquid medium.

Materials in finely divided form are used in many industrial processes and it is frequently necessary or desirable in connection with such processes to determine certain physical characteristics of the finely divided material such as its particle size or particle size distribution. Such a particle size determination may be desirable, for example, to control the characteristics of the material to be used in the process in order to make sure that the final product produced will have a desired uniformity. One method of determining particle size distribution that has been used with some success involves dispersing the finely divided material to be tested in a suitable medium and measuring the rate at which solid particles settle out of the resulting suspension and the rate at which the density of the supernatant liquid varies. On the basis of Stokes' law and certain other theoretical considerations it is possible to correlate these two measurements in such manner as to obtain information concerning the particle size distribution of the finely divided material.

In determining particle size distribution in this way the change in density of the suspension as settling occurs must be accurately measured and the sedimentation apparatus used must be capable of yielding such an accurate measurement. In one type of sedimentation apparatus that has been previously proposed the suspension is placed in a vertically disposed settling tube having a capillary side arm connected to the settling tube near the bottom of the tube and extending upwardly in a direction generally parallel to the settling tube. The capillary side arm is filled with a measuring liquid and the level of the measuring liquid within the capillary is used as a measure of the density of the suspension in the settling tube. It is apparent that as the settling of the suspension takes place the hydrostatic pressure at the junction of the settling tube and the capillary measuring tube will decrease and the level of the measuring liquid in the capillary measuring tube will drop. This drop in level may be taken as a measure of the change of the density of the suspension within the settling tube. The measuring liquid may be the same as the liquid medium in which the finely divided material is dispersed or may be a different liquid and may have the same density as the liquid medium of the suspension or may have a greater or lesser density.

Difficulties have been encountered in using the previously proposed types of sedimentation tubes. Thus there is a tendency for the suspension to flow from the settling tube into the capillary side arm or measuring tube thus altering the density of the measuring liquid and thereby introducing an error into the reading. Such intermingling of the suspension and measuring liquid may occur whether the measuring liquid is the same as the dispersion medium of the suspension or not but is particularly serious when the measuring liquid is a different liquid from the dispersion medium and is either more or less dense than the dispersion medium. Still another difficulty sometimes encountered with the previous constructions arises out of the tendency of the dispersion medium to evaporate during the course of the test. In the case of materials having an unusually fine state of subdivision the rate of settling may be very slow and the settling test may extend over a period of many hours. If evaporation is permitted to occur freely over such a long period of time the composition of the suspension within the tube will change to an indeterminate extent and thus introduce an error into the final result.

It is accordingly an object of the present invention to provide an improved apparatus for determining the settling rate of a suspension of a finely divided material.

It is another object of the invention to provide apparatus for determining the particle size distribution of a finely divided material.

It is still another object of the invention to provide sedimentation apparatus which permits the effective use of a measuring liquid having a density different from that of the liquid dispersion medium of the suspension being tested.

It is a still further object of the invention to provide apparatus of this character capable of substantially preventing intermingling of the suspension being tested and the measuring liquid.

Other objects of the invention will be in part obvious and in part pointed out hereinafter.

Sedimentation apparatus incorporating a preferred embodiment of the present invention is illustrated in the accompanying drawing. Referring to the drawing the numeral 10 designates a relatively long vertically arranged sedimentation tube containing a suspension 12 having an upper liquid surface 14. Connected to the sedimentation tube 10 near the top and bottom thereof is a capillary measuring tube 16 containing a measuring liquid 18 having an upper liquid surface 20. The capillary tube 16 near its upper junction with the sedimentation tube 10 is provided with a stopcock 22 by means of which the capillary tube 16 may be closed off and flow of the measuring liquid 18 through the tube 16 prevented. Near the lower junction of the sedimentation tube 10 and measuring tube 16 there is a liquid trap 24 comprising a double reverse bend formed in the capillary tube 16. The trap 24 serves to prevent intermingling of the suspension 12 and measuring liquid 18. In order to prevent undesired evaporation from the sedimentation tube 10 a plug 26 is provided having a face 28 which fits snugly against a corresponding face 30 formed in the upper open end of the tube 10. By means of the plug 26 the entire apparatus may be closed off from the atmosphere to substantially prevent evaporation of the dispersing medium of the suspension 12 or the measuring liquid 18 during the period when a settling test is being made.

In a typical instance the sedimentation apparatus shown in the accompanying drawing was used to measure the particle size distribution of a quantity of finely divided nickel carbonate. The nickel carbonate powder was dispersed in distilled water to form a suspension containing about 1% solids. In setting up the apparatus for testing this suspension the plug 26 was removed, stopcock 22 opened and the apparatus filled with distilled water to the liquid level 20. The stopcock 22 was then closed to prevent further flow of the measuring liquid 18 within the measuring tube 16 and the tube 10 was emptied. The settling tube 10 was then filled with the 1% suspension to the level 14. The plug 26 was inserted in the mouth of the tube 10 and the stopcock 22 opened to permit the measuring liquid 18 to find its level. Since the density of the suspension 12 was greater than that of the measuring liquid 18, the level 20 was higher than the level 14.

As the suspended particles settled the hydrostatic pressure exerted on the measuring liquid 18 at the lower junction of tubes 10 and 16 decreased, thus causing the level 20 to drop. The drop in the level 20 was observed over a period of time and from these readings and measurements of the quantity of solid material that settled out in the bottom of tube 10 the particle size distribution of the nickel carbonate was computed. It was found that the liquid trap 24 effectively prevented intermingling of the nickel carbonate suspension in tube 10 and the water in the measuring tube 16.

It is of course to be understood that the present apparatus may be used to determine the settling rates of a wide variety of powdered materials dispersed in many different media and that many different measuring liquids may be used. In cases where the measuring liquid differs from the dispersing medium the liquid trap 24 effectively prevents intermingling of the two liquids and is particularly useful where the two liquids differ in density. The trap 24 may comprise only a single reverse bend in the capillary measuring tube 16 but a double reverse bend has been found more effective. The stopcock 22 is of considerable assistance in preventing intermingling of the measuring liquid 18 and suspension liquid 12 after the measuring liquid has been inserted in the capillary measuring tube 16 and during the period when the suspension liquid 12 is being introduced into the sedimentation tube 10. The plug 26 effectively prevents evaporation from the surface 14 of the suspension liquid 12 and the surface 20 of the measuring liquid 18, thereby reducing possible errors from this source. Thus the present invention provides a compact and accurate apparatus for determining by sedimentation the particle size distribution of a finely divided material.

We claim:

1. In apparatus for determining the rate of sedimentation of a finely divided material, in combination, a sedimentation tube adapted to receive a quantity of a suspension of said finely divided material in a liquid medium, a capillary measuring tube adapted to contain a measuring liquid and connected to said sedimentation tube at points above and below the normal liquid level of said suspension and a liquid trap formed in said capillary measuring tube near the lower junction of said capillary measuring tube and said sedimentation tube to prevent intermingling of said suspension and said measuring liquids.

2. In apparatus for determining the rate of sedimentation of a finely divided material, in combination, a sedimentation tube adapted to receive a quantity of a suspension of said finely divided material in a liquid medium, a capillary measuring tube adapted to receive a measuring liquid, the opposite ends of said capillary measuring tube being connected to said sedimentation tube at points above and below the normal liquid level of suspension within said sedimentation tube, valve means in said capillary measuring tube for selectively preventing flow of said measuring liquid in said capillary measuring tube and a liquid trap formed in the lower end of said capillary measuring tube near its junction with said sedimentation tube to prevent intermingling of said suspension and said measuring liquids.

3. In apparatus for determining the rate of sedimentation of a finely divided material, in combination, a sedimentation tube adapted to receive a quantity of a suspension of said finely divided material in a liquid medium, a capillary measuring tube adapted to receive a measuring liquid, the opposite ends of said capillary measuring tube being connected to said sedimentation tube at points above and below the normal liquid level of the suspension in said sedimentation tube and a liquid trap in said capillary measuring tube near its lower junction with said sedimentation tube to prevent intermingling of said suspension and said measuring liquids, said liquid trap comprising a reverse bend formed in said capillary measuring tube.

4. In apparatus for determining the rate of sedimentation of a finely divided material, in combination, a sedimentation tube adapted to receive a quantity of a suspension of said finely divided material in a liquid medium, a capillary measuring tube adapted to receive a measuring liquid, the opposite ends of said capillary measuring tube being connected to said sedimentation tube at points above and below the normal liquid level of the suspension in said sedimentation tube, valve means in said capillary measuring tube for selectively preventing flow of said measuring liquid in said capillary measuring tube and a liquid trap formed in said capillary measuring tube near its lower junction with said sedimentation tube to prevent intermingling of said suspension and said measuring liquids, said liquid trap comprising a reverse bend formed in said capillary measuring tube.

5. In apparatus for determining the rate of sedimentation of a finely divided material, in combination, a sedimentation tube adapted to receive a quantity of a suspension of said finely divided material in a liquid medium, a capillary measuring tube adapted to receive a measuring liquid, the opposite ends of said capillary tube being connected to said sedimentation tube at points above and below the normal liquid level of the suspension in said sedimentation tube and a liquid trap in said capillary measuring tube near its lower junction with said sedimentation tube to prevent intermingling of said suspension and said measuring liquids, said liquid trap comprising a double reverse bend formed in said capillary measuring tube.

JOHN W. WILLIAMS.
E. M. BEVILACQUA.

REFERENCES CITED

The following references are of record in the file of this patent:

UNITED STATES PATENTS

| Number | Name | Date |
|---|---|---|
| 1,082,304 | Cary-Curr | Dec. 23, 1913 |
| 1,179,695 | Caldwell | Apr. 18, 1916 |
| 2,343,061 | Irany | Feb. 29, 1944 |
| 2,371,457 | Mendius | Mar. 13, 1945 |

FOREIGN PATENTS

| Number | Country | Date |
|---|---|---|
| 99,089 | Sweden | Apr. 11, 1940 |